United States Patent
Tayloe et al.

(10) Patent No.: US 8,223,707 B2
(45) Date of Patent: Jul. 17, 2012

(54) METHOD AND APPARATUS FOR RESOURCE ALLOCATION IN AN ORTHOGONAL FREQUENCY DIVISION MULTIPLEXING COMMUNICATION SYSTEM

(75) Inventors: Daniel R. Tayloe, Phoenix, AZ (US); Chih-Ming J. Chiang, Chandler, AZ (US); Mark T. Pflum, David City, NE (US)

(73) Assignee: Motorola Mobility, Inc., Libertyville, IL (US)

( * ) Notice: Subject to any disclaimer, the term of this patent is extended or adjusted under 35 U.S.C. 154(b) by 434 days.

(21) Appl. No.: 12/478,036

(22) Filed: Jun. 4, 2009

(65) Prior Publication Data
US 2010/0165934 A1 Jul. 1, 2010

Related U.S. Application Data

(60) Provisional application No. 61/141,773, filed on Dec. 31, 2008.

(51) Int. Cl.
*H04W 52/00* (2009.01)
(52) U.S. Cl. ........................ 370/329; 375/260
(58) Field of Classification Search ........................ None
See application file for complete search history.

(56) References Cited

U.S. PATENT DOCUMENTS

| | | |
|---|---|---|
| 2006/0205413 A1 | 9/2006 | Teague |
| 2006/0291393 A1 | 12/2006 | Teague et al. |
| 2008/0095050 A1 | 4/2008 | Gorokhov et al. |
| 2008/0130560 A1* | 6/2008 | Khandekar et al. ........... 370/329 |
| 2009/0180433 A1* | 7/2009 | Ahn et al. ..................... 370/329 |
| 2010/0103901 A1* | 4/2010 | Miki et al. .................... 370/330 |
| 2010/0284377 A1* | 11/2010 | Wei et al. ...................... 370/336 |
| 2011/0096708 A1* | 4/2011 | Novak et al. .................. 370/311 |

* cited by examiner

*Primary Examiner* — Min Jung

(57) ABSTRACT

A method and Node B are disclosed for allocation of "sticky" resources in an Orthogonal Frequency Division Multiplexing communication system. The Node B comprises a scheduler that is configured to make a sticky resource allocation to a user equipment, determine that a transmit power level allocated for transmissions to the user equipment should be adjusted, determine whether the resources allocated to the user equipment comprise a Quadrature Phase Shift Keying (QPSK) modulation scheme, and in response to determining that the resources allocated to the user equipment comprise a QPSK modulation scheme, adjust the allocated transmit power level without informing the user equipment of the adjustment. The Node B further may condition the determination to adjust the allocated transmit power level without informing the UE of the adjustment based on a size of the adjustment.

10 Claims, 3 Drawing Sheets

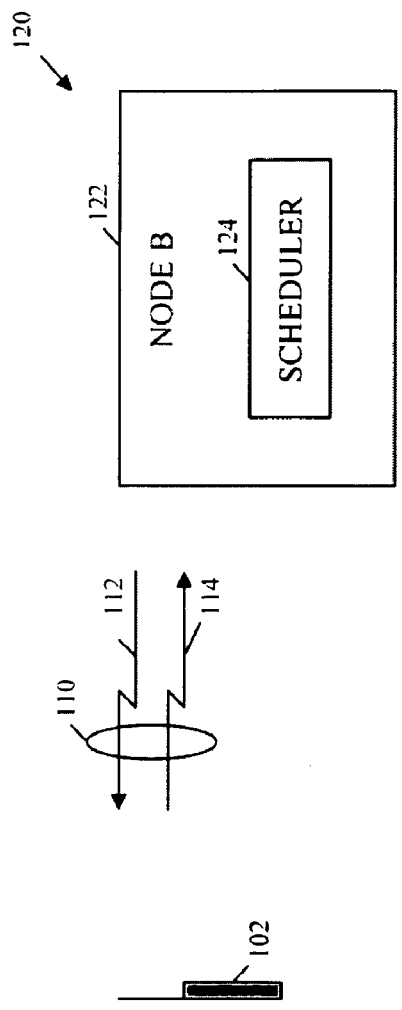
FIG. 1
FIG. 2
FIG. 3

METHOD AND APPARATUS FOR RESOURCE ALLOCATION IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 61/141,773, entitled "METHOD AND APPARATUS FOR RESOURCE ALLOCATION IN AN ORTHOGONAL FREQUENCY DIVISION MULTIPLEXING COMMUNICATION SYSTEM," filed Dec. 31, 2008, which is commonly owned and incorporated herein by reference in its entirety.

FIELD OF THE INVENTION

The present invention relates generally to Orthogonal Frequency Division Multiplexing (OFDM) communication systems, and, in particular, to resource allocation in an OFDM communication system.

BACKGROUND OF THE INVENTION

The 3GPP (Third Generation Partnership Project) Long Term Evolution (LTE) standards propose using Orthogonal Frequency Division Multiple Access (OFDMA) for transmission of data over an air interface. In an OFDMA communication system, a frequency bandwidth employed by the communication system is split into multiple frequency sub-bands, or Physical Resource Blocks (PRBs), during a given time period. Each PRB comprises multiple orthogonal frequency sub-carriers over a given number of OFDM symbols, or time slots, that are the physical layer channels over which traffic and signaling channels are transmitted in a TDM or TDM/FDM fashion.

In order to maximize bandwidth usage, OFDMA communication systems may engage in Frequency Selective Scheduling (FSS) or Frequency Diverse Scheduling (FDS). In both FSS and FDS, PRBs are scheduled for a UE on a scheduling period-by-scheduling period basis. For example, in FSS, transmission errors are minimized by scheduling a user equipment (UE) for an PRB only where the UE is known to have a good downlink channel. FSS uses channel feedback from the UE, wherein for any given Transmission Time Interval (TTI) the PRBs are allocated to users based on measured channel conditions. The channel condition measurements are performed by a UE, which UE measures channel conditions for each and every PRB during a measuring period, such as a Transmission Time Interval (TTI) (also known as a sub-frame) or a radio frame transmission period. The UE then reports the measured channel conditions for the PRBs to a serving Node B in a Channel Quality Information (CQI) message. Based on the reported CQIs, an OFDMA communication system then selectively schedules the PRBs over a scheduling period, typically one or more TTIs or radio frames, and further adaptively determines appropriate modulation and coding schemes for each RB during the scheduling period. In FDS, the UE is scheduled for PRBs without channel feedback or only wideband channel feedback, wherein the channel quality reported is over the whole bandwidth and diversity of the PRBs is relied on to minimize transmission errors.

In a 3GPP LTE system, voice data is exchanged via Voice over Internet Protocol (VoIP). Under typical air interface, or radio frequency (RF), conditions in a 3GPP LTE communication system, there is only enough transmit power and frequency bandwidth to make between 6.5 and 8.5 user resource assignments per slot (1 ms), or 6500 to 8500 assignments per second. A VoIP communication session involves a conveyance of 50 data packets per second. For 3GPP LTE systems that are supposed to handle 500 Voice over Internet Protocol (VoIP) users per second, this amounts to 25,000 (500*50) resource assignments per second, which is far more than an available capacity for resource assignment.

To reduce the system capacity consumed by overhead messages such as resource assignments, a Node B may make a "sticky" resource assignment to a user, that is, a resource (for example, PRB) assignment that persists over a period of time, such as multiple scheduling periods, as opposed to being applicable to a single TTI or radio frame. In other words, a "sticky" resource is a dedicated resource that is statically allocated to a user over a period of time and may require de-assignment of the resource in order to assign it to another user. This is as opposed to "time limited," or "non-sticky," assignments that have a deterministic expiration time.

"Sticky" resource assignments specify specific modulation schemes, such as QPSK (Quadrature Phase Shift Keying), 16-QAM (Quadrature Amplitude Modulation), and 64-QAM, specific coding rates, such as a ¼ coding rate, a ½ coding rate, a ¾ coding rate, transmit power levels, and so on. However, in a wireless communication system, RF conditions are not static. Changing RF conditions necessitate a change in an allocated resource, such as a new coding rate, modulation scheme, or transmit power level, with the result that shifting RF conditions may lead to potentially frequent changing of "sticky" resource assignments, which again may exceed the available capacity for such resource assignment.

Therefore a need exists for a method and apparatus that better preserves a persistence of a "sticky" resource allocation under shifting RF conditions, reducing the need to change "sticky" resource allocations when RF conditions change.

BRIEF DESCRIPTION OF THE DRAWINGS

FIG. 1 is a block diagram of a wireless communication system in accordance with an embodiment of the present invention.

FIG. 2 is a block diagram of a user equipment of the communication system of FIG. 1 in accordance with an embodiment of the present invention.

FIG. 3 is a block diagram of a Node B of the communication system of FIG. 1 in accordance with an embodiment of the present invention.

Figure 4:
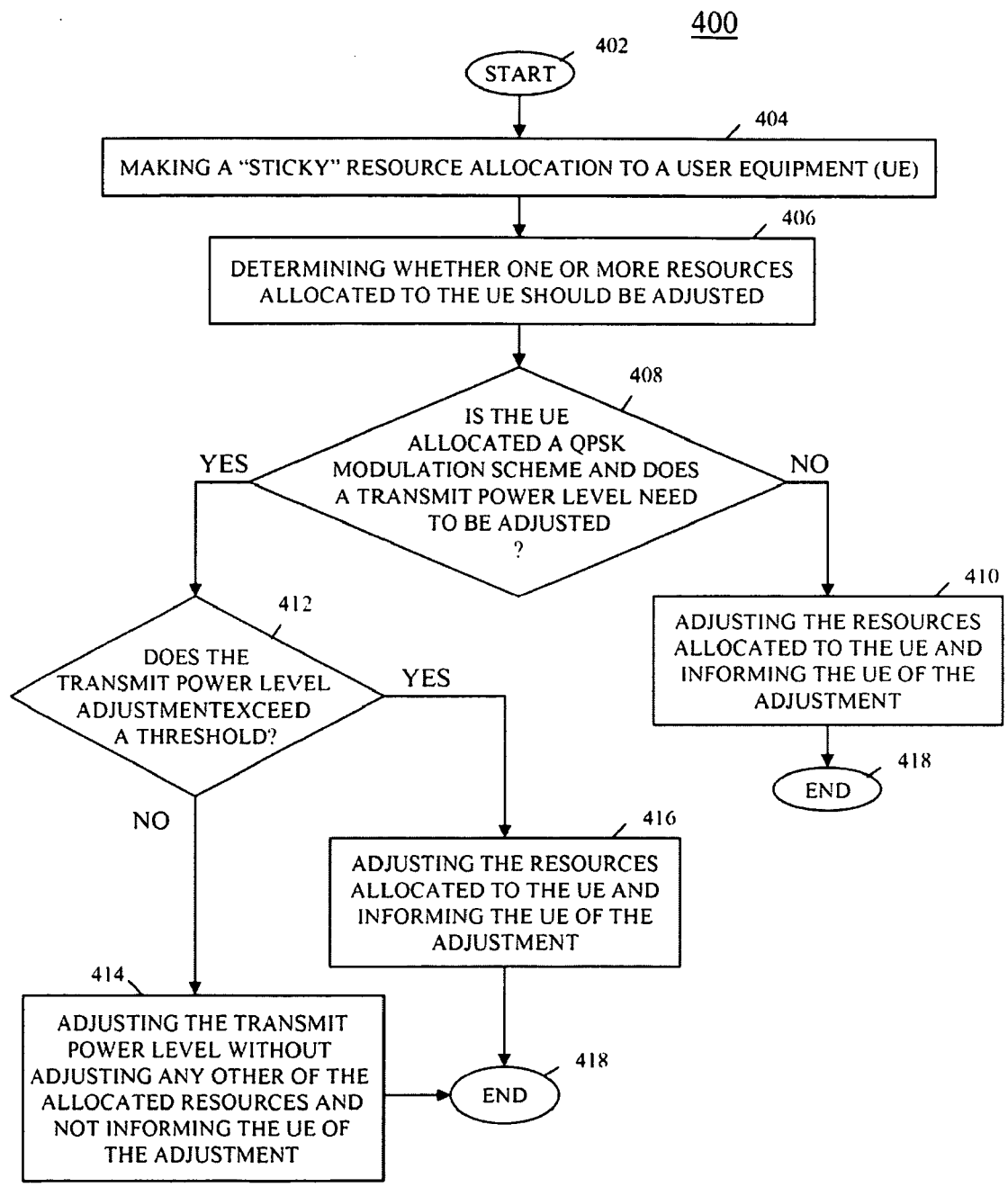
FIG. 4 is a logic flow diagram of a method executed by a Node B of the communication system of FIG. 1 in allocating resources in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and apparatus that better preserves a persistence of a "sticky" resource allocation under shifting RF conditions, reducing the need to change "sticky" resource allocations when RF conditions change, a method and Node B are disclosed for allocation of "sticky" resources in an Orthogonal Frequency Division Multiplexing (OFDM) communication system. The Node B comprises a scheduler that is configured to make a sticky resource allocation to a user equipment (UE), determine that a transmit power level allocated for transmissions to the UE should be adjusted, determine whether the resources allocated to the UE comprise a Quadrature Phase Shift Keying (QPSK) modulation scheme, and in response to determining that the resources allocated to the UE comprise a QPSK modulation scheme, adjust the allocated transmit power level without informing the user equipment of the adjustment. The Node B further may condition the determination to adjust the allocated transmit power level without informing the UE of the adjustment based on a size of the adjustment.

That is, generally, an embodiment of the present invention encompasses a method for allocating resources in an OFDM communication system. The method includes making a sticky resource allocation to a UE, determining that a transmit power level allocated for transmissions to the UE should be adjusted, determining whether the resources allocated to the UE comprise a QPSK modulation scheme, and in response to determining that the resources allocated to the UE comprise a QPSK modulation scheme, adjusting the allocated transmit power level without informing the UE of the adjustment.

Yet another embodiment of the present invention encompasses a Node B that is capable of allocating resources in an OFDM communication system. The Node B includes a scheduler that is configured to make a sticky resource allocation to a UE, determine that a transmit power level allocated for transmissions to the UE should be adjusted, determine whether the resources allocated to the UE comprise a Quadrature Phase Shift Keying (QPSK) modulation scheme, and in response to determining that the resources allocated to the UE comprise a QPSK modulation scheme, adjust the allocated transmit power level without informing the UE of the adjustment.

The present invention may be more fully described with reference to FIGS. 1-5. FIG. 1 is a block diagram of a wireless communication system 100 in accordance with an embodiment of the present invention. Communication system 100 includes at least one user equipment (UE) 102, such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. Communication system 200 further includes a Radio Access Network (RAN) 120 that provides communication services to users equipment, such as UE 102, residing in a coverage area of the RAN via an air interface 110.

RAN 120 includes a Node B 122 in wireless communication with each UE, such as UE 102, residing in a coverage area of, and serviced by, the Node B. Node B 122 includes a scheduler 124 that performs the allocating functions described herein as being performed by the Node B. In other embodiments of the invention, the scheduler may be implemented in a network element separate from, and in communication with, the Node B. For example, if RAN 120 includes an access network controller, the scheduler may be implemented in such a controller. Air interface 110 comprises a downlink 112 and an uplink 114. Each of downlink 112 and uplink 114 comprises multiple physical communication channels, including at least one signaling channel and at least one traffic channel. For example, downlink 112 may include a Physical broadcast channel (PBCH), a Physical downlink control channel (PDCCH), and a Physical downlink shared channel (PDSCH), and uplink 114 may include a Physical random access channel (PRACH), a Physical uplink control channel (PUCCH), and a Physical uplink shared channel (PUSCH).

FIG. 2 is a block diagram of UE 102 in accordance with an embodiment of the present invention. UE 102 includes a processor 202, such as one or more microprocessors, microcontrollers, digital signal processors (DSPs), combinations thereof or such other devices known to those having ordinary skill in the art. The particular operations/functions of processor 202, and thus of UE 102, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor.

FIG. 3 is a block diagram of Node B 122 in accordance with an embodiment of the present invention. Node B 122 includes a processor 302, such as one or more microprocessors, microcontrollers, digital signal processors (DSPs), combinations thereof or such other devices known to those having ordinary skill in the art. The particular operations/functions of processor 302, and respectively thus of Node B 122, are determined by an execution of software instructions and routines that are stored in an at least one memory device 304 associated with the processor, such as random access memory (RAM), dynamic random access memory (DRAM), and/or read only memory (ROM) or equivalents thereof, that store data and programs that may be executed by the corresponding processor. Among the software instructions and routines that are stored in at least one memory device 304 of Node B 122 is scheduler 124, which scheduler is implemented by processor 302 based on the software instructions and routines stored in the at least one memory device. Unless otherwise provided herein, the functions described herein as being performed by Node B 122, and in particular, the resource allocation functions described herein as being performed by the Node B, are performed by scheduler 124.

The embodiments of the present invention preferably are implemented within UE 102 and Node B 122, and more particularly with or in software programs and instructions stored in the respective at least one memory device 204, 304 and executed by respective processors 202, 302 of the UE and Node B. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UE 102 and Node B 122. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 110. Communication system 100 is an Orthogonal Frequency Division Multiple Access (OFDMA) communication system, wherein a frequency bandwidth employed by the communication system is split into multiple frequency sub-bands, or Physical Resource Blocks (PRBs), during a given time period. Each PRB comprises multiple orthogonal frequency sub-carriers over a given number of OFDM symbols, or time slots, that are the physical layer channels over which traffic and signaling channels are transmitted in a TDM or TDM/FDM fashion. From another perspective, each PRB includes multiple resource elements, wherein each resource element comprises a frequency sub-carrier over an OFDM symbol. In addition, communication system 100 preferably comprises a 3GPP (Third Generation Partnership Project) Long Term Evolution (LTE) communication system and RAN 120 is an E-UTRAN (Evolutionary UMTS Terrestrial Radio Access Network), which LTE standards specify wireless telecommunications system operating protocols, including radio system parameters and call processing procedures. However, those who are of ordinary skill in the art realize that communication system 100 may operate in accordance with any wireless Orthogonal Frequency Division Multiplexing (OFDM) communication system that might employ "sticky" resource scheduling, such as 3GPP (Third Generation Partnership Project) E-UTRA (Evolutionary UMTS Terrestrial Radio Access) communication system, a 3GPP2 (Third Generation Partnership Project 2) Evolution communication system, for example, an Ultra Mobile Broadband (UMB) communication system, a Wireless Local Area Network (WLAN) communication system as described by the IEEE 902.xx standards, for example, the 902.11a/HiperLAN2, 902.11 g, or 902.20 standards, or any of multiple proposed ultrawideband (UWB) communication systems.

In order to preserve a persistence of a "sticky" resource allocation under shifting RF conditions, reducing the need to change "sticky" resource allocations when RF conditions change, communication system 100 provides for downlink transmit power adjustments without informing a UE that an allocated resource is being adjusted. This reduces the overhead messaging necessitated by resource adjustments in the prior art and the corresponding change in a "sticky" resource allocation.

Referring now to FIG. 4, a logic flow diagram 400 is provided that illustrates a method executed by Node B 122, and in particular by scheduler 124, in allocating resources in accordance with an embodiment of the present invention. Logic flow diagram 400 begins (402) when Node B 122 makes (404) a "sticky" resource assignment to a UE, such as UE 102, in accordance with known resource allocation techniques. Among the resources allocated to the UE as part of the "sticky" resource assignment are a modulation scheme, such as QPSK (Quadrature Phase Shift Keying), 16-QAM (Quadrature Amplitude Modulation), and 64-QAM, a coding rate, such as a ¼ coding rate, a ½ coding rate, a ¾ coding rate, and a transmit power level.

While the "sticky" resource assignment is in effect, the conditions of air interface 110 change such that a quality of signals exchanged between Node B 120 and UE 102 are affected. For example, the air interface may experience more or less interference, the air interface may become more of less congested, or more UEs may roam into or out of, or may active in or deactivate in, the coverage area of the Node B. As a result, the Node B determines (406) whether one or more of the resources allocated to UE 102 should be adjusted.

In various embodiments of the present invention, Node B 122 may determine that one or more of the resources allocated to UE 102 need to be adjusted based on measurements, by the Node B, of signals received by the Node B from UE 102, or based on feedback from the UE. For example, Node B 122 may determine a signal quality metric, such as received signal strength, a Carrier-to-Interference ratio (C/I), a Signal-to-Noise Ratio (SNR), a Bit Error Rate (BER), or a Frame Error Rate (FER), for uplink signals, such as an uplink pilot signal, received by the Node B from the UE. By way of another example, Node B may transmit known downlink signals, such as pilot signals, to the UE and the UE then may feedback a signal quality, such as a Channel Quality Information (CQI) determined by the UE in association with the received downlink signals. In one such embodiment, Node B 122 then may compare each determined signal quality metric to a previously determined signal quality metric, or to a corresponding signal quality metric threshold that is stored in one or more memory devices 304 of the Node B. When a designated number of determined signal quality metrics compare unfavorably with their corresponding signal quality metric thresholds, Node B 122 may determine that that one or more of the resources allocated to UE 102 need to be adjusted. In another such embodiment of the present invention, the determined signal quality metric, such as a received CQI, may be associated with a given resource allocation. For example, each CQI value may be associated with a particular modulation scheme and coding rate. Based on the received CQI value, the Node B may determine that one or more of the resources allocated to UE 102 need to be adjusted.

By way of yet another example, Node B 122 may determine that a condition of the air interface has changed, and that one or more of the resources allocated to UE 102 need to be adjusted, based on codebook-based signal quality feedback provided by the UE, such as a codebook index value, a rank index, and/or a Pre-coding Matrix Indication (PMI) index value fed back by the UE in accordance with known codebook-based feedback techniques. That is, codebook-based beamforming weight selection that involves selection, by a Node B based on feedback from a UE, of a set of pre-coding matrices, that is, predetermined beamforming weights that are agreed upon between a transmitter and receiver. The weights are selected from a set, or codebook, of predetermined and agreed upon (that is, known to both the Node B and UE) matrices of beamforming weights. Each matrix in the codebook can be identified by an index, and the UE identifies the weights to be applied by feeding back an index to a matrix and rank of the matrix. In this way, only an index and a rank need be used in feedback to the Node B in order for the transmitter to know the proper weights to use. In order to provide such feedback, the Node B conveys a midamble, that is, a predetermined signal, to the UE. Based on the received midamble, the UE computes a channel response for the air interface between the UE and the Node B and, based on the channel response, determines a matrix and rank of weights for application to downlink transmissions.

Figure 5:
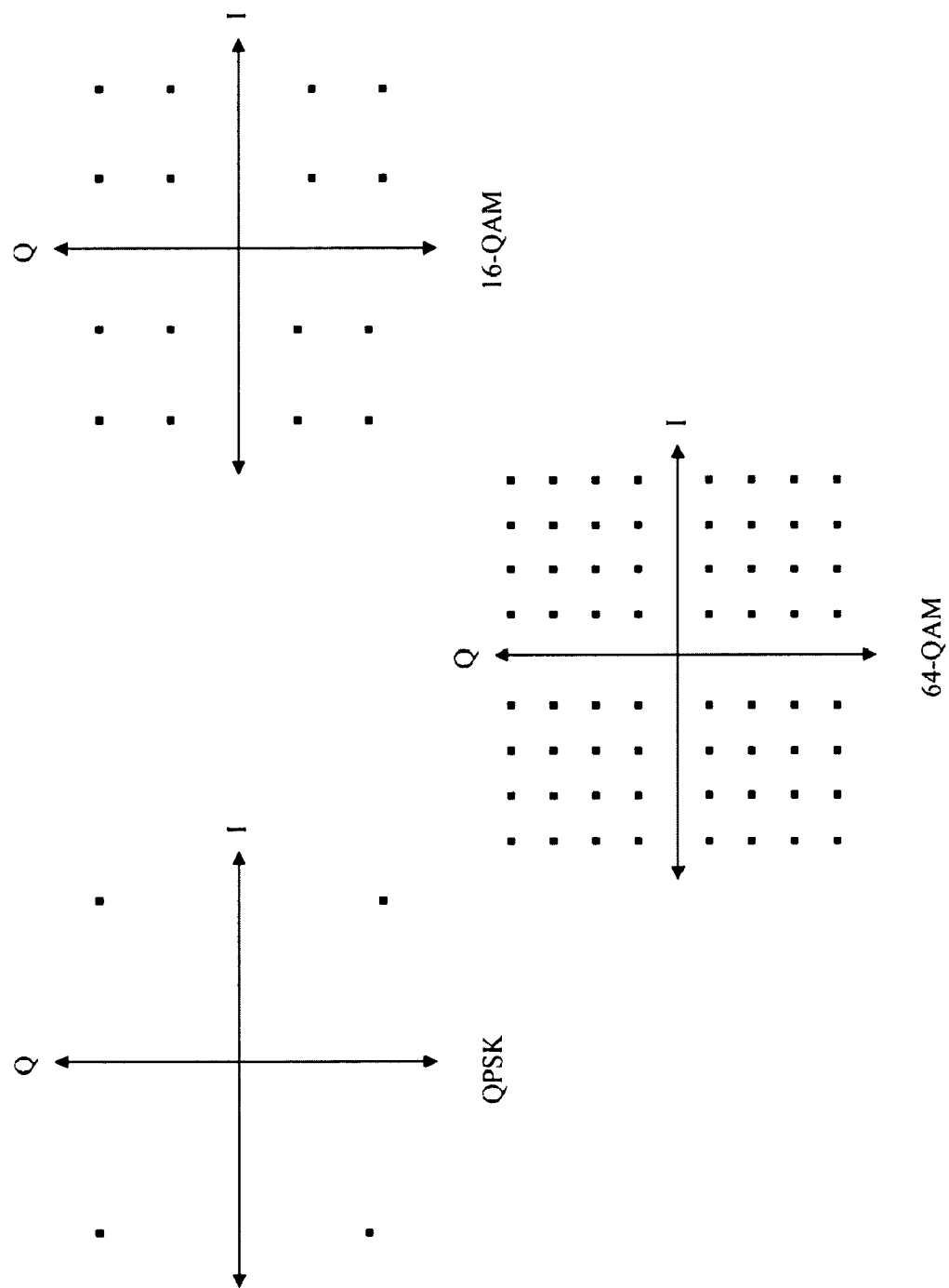
FIG. 5 is a graphical representation of symbol constellations associated with various modulation schemes in accordance with an embodiment of the present invention.

In response to determining that one or more of the resources allocated to UE 102 need to be adjusted, Node B 122 further determines (408) whether the modulation scheme allocated to the UE is a QPSK modulation scheme and whether the one or more resources allocated to UE 102 need to be adjusted includes an adjustment in a transmit power level. For example, referring now to FIG. 5, graphical representations of symbol constellations associated with various modulation schemes, such as QPSK, 16-QAM, and 64-QAM, is provided in accordance with an embodiment of the present invention. As can be seen in FIG. 5, 16-QAM and 64-QAM modulation schemes require both an amplitude reference and a phase reference to properly decode a received symbol. That is, each symbol in a constellation of 16-QAM and 64-QAM symbols is represented by both a phase and an amplitude. An incorrect amplitude reading of a received signal may result in a mapping of a received signal to an incorrect symbol in the constellation. In order to properly decode an amplitude of a signal, reference symbols (known symbols) are typically included in a transmitted signal; however, an erroneous decoding of an amplitude reference may result in an incorrect decoding of a received symbol. Therefore, for 16-QAM and 64-QAM modulation schemes, the transmit power levels must be properly set. However, a QPSK modulation scheme merely requires a phase reference to properly decode a received symbol and does not need a accurate amplitude reference. Therefore, a QPSK modulation scheme is more tolerant to errors in the amplitude reference and to variations in the transmit power level.

As a result, when Node B 122 determines, at step 408, that the modulation scheme allocated to the UE is not a QPSK modulation scheme or that an adjustment in a transmit power level is desired, then the Node B adjusts (410) the resources allocated to the UE for a subsequent downlink transmission, such as one or more of the allocated modulation scheme, coding rate, and transmit power level, and informs the UE of the resource adjustment. Logic flow 400 then ends (418). However, when Node B 122 determines, at step 408, that the modulation scheme allocated to the UE is a QPSK modulation scheme and that an adjustment in a transmit power level is desired, then the Node B further determines (412) whether the desired transmit power level adjustment exceeds a transmit power level adjustment threshold. For example, the threshold may be 6 dB and Node B 122 then determines whether the adjustment exceeds +/−6 dB. If the desired adjustment is less than the power level adjustment threshold, then Node B 122 adjusts (414) the downlink transmit power level without adjusting any other resources and without informing the UE of the adjustment, and logic flow 400 ends (418). If the desired adjustment is greater than the power level adjustment threshold, then Node B 122 adjusts (416) the resources allocated to the UE for a subsequent downlink transmission, such one or more of the allocated modulation scheme, coding rate, and transmit power level, and informs the UE of the resource adjustment. Logic flow 400 then ends (418).

Thus Node B 122, and more particularly scheduler 124, preserves system resources by adjusting a sticky resource allocation without informing a UE of the adjustment, thereby saving overhead messaging. The Node B makes a sticky resource allocation to a UE, determines that a transmit power level allocated for transmissions to the UE should be adjusted, determines whether the resources allocated to the UE comprise a QPSK modulation scheme, and in response to determining that the resources allocated to the UE comprise a QPSK modulation scheme, adjusts the allocated transmit power level without informing the UE of the adjustment. The Node B may further condition the determination to adjust the allocated transmit power level without informing the UE of the adjustment based on a size of the adjustment.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for allocating resources in an Orthogonal Frequency Division Multiplexing communication system, the method comprising:
    making a sticky resource allocation to a user equipment;
    determining that a transmit power level of the sticky resource allocation allocated for transmissions to the user equipment should be adjusted;
    determining that the resources allocated to the user equipment comprise a Quadrature Phase Shift Keying (QPSK) modulation scheme; and
    in response to determining that the resources allocated to the user equipment comprise a QPSK modulation scheme, adjusting the allocated transmit power level without informing the user equipment of the adjustment.

2. The method of claim 1, wherein adjusting the allocated transmit power level without informing the user equipment of the adjustment comprises determining a size of the adjustment and determining to adjust the allocated transmit power level without informing the user equipment of the adjustment based on the size of the adjustment.

3. The method of claim 1, wherein adjusting the allocated transmit power level without informing the user equipment of the adjustment comprises
    comparing a size of an adjustment of the transmit power level to a threshold;
    when the size of the adjustment is less than the threshold, adjusting the allocated transmit power level without informing the user equipment of the adjustment.

4. The method of claim 3, wherein the method further comprises, when the adjustment exceeds the threshold, adjusting the allocated transmit power level and informing the user equipment of the adjustment.

5. The method of claim 1, further comprising, in response to determining that the resources allocated to the user equipment comprise a modulation scheme different from a QPSK modulation scheme, adjusting the allocated transmit power level and informing the user equipment that the allocated resources have been adjusted.

6. A Node B that is capable of allocating resources in an Orthogonal Frequency Division Multiplexing communication system, the Node B comprising a scheduler that is configured to make a sticky resource allocation to a user equipment, determine that a transmit power level of the sticky resource allocation allocated for transmissions to the user equipment should be adjusted, determine that the resources allocated to the user equipment comprise a Quadrature Phase Shift Keying (QPSK) modulation scheme, and in response to determining that the resources allocated to the user equipment comprise a QPSK modulation scheme, adjust the allocated transmit power level without informing the user equipment of the adjustment.

7. The Node B of claim 6, wherein the scheduler is configured to adjust the allocated transmit power level without informing the user equipment of the adjustment by determining a size of the adjustment and determining to adjust the allocated transmit power level without informing the user equipment of the adjustment based on the size of the adjustment.

8. The Node B of claim 6, wherein the scheduler is configured to adjust the allocated transmit power level without informing the user equipment of the adjustment by comparing a size of an adjustment of the transmit power level to a threshold and when the size of the adjustment is less than the threshold, adjust the allocated transmit power level without informing the user equipment of the adjustment.

9. The Node B of claim 8, wherein the scheduler is further configured to, when the adjustment exceeds the threshold, adjust the allocated transmit power level and informing the user equipment of the adjustment.

10. The Node B of claim 6, wherein the scheduler is further configured to, in response to determining that the resources allocated to the user equipment comprise a modulation scheme different from a QPSK modulation scheme, adjust the allocated transmit power level and inform the user equipment that the allocated resources have been adjusted.

* * * * *